(No Model.)

J. H. HAMMER.
HOISTING DEVICE.

No. 588,827. Patented Aug. 24, 1897.

Witnesses
Frank H. Flight
H. H. Timmerman

Inventor
J. Henry Hammer.

By
Henry C. Evert. Attorney

UNITED STATES PATENT OFFICE.

JOHN HENRY HAMMER, OF ALLEGHENY, PENNSYLVANIA.

HOISTING DEVICE.

SPECIFICATION forming part of Letters Patent No. 588,827, dated August 24, 1897.

Application filed March 15, 1897. Serial No. 627,640. (No model.)

*To all whom it may concern:*

Be it known that I, JOHN HENRY HAMMER, a citizen of the United States of America, residing at Allegheny, in the county of Allegheny and State of Pennsylvania, have invented certain new and useful Improvements in Hoisting Devices, of which the following is a specification, reference being had therein to the accompanying drawings.

This invention relates to certain new and useful improvements in hoisting devices, and has for its object to provide a device whereby a heavy weight can be moved with little power.

The invention further aims to construct a device which will be extremely simple in its construction, strong, durable, effectual in its operation, and comparatively inexpensive to manufacture; and the invention further resides in the novel construction, combination, and arrangement of parts, to be hereinafter more specifically described, and particularly pointed out in the claim.

In describing the invention in detail reference is had to the accompanying drawings, forming a part of this specification, and wherein like figures of reference indicate similar parts throughout the several views, in which—

Figure 1:
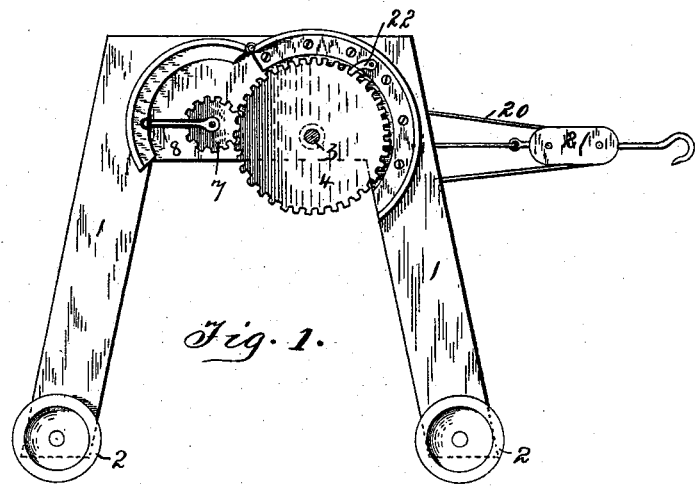
Figure 2:
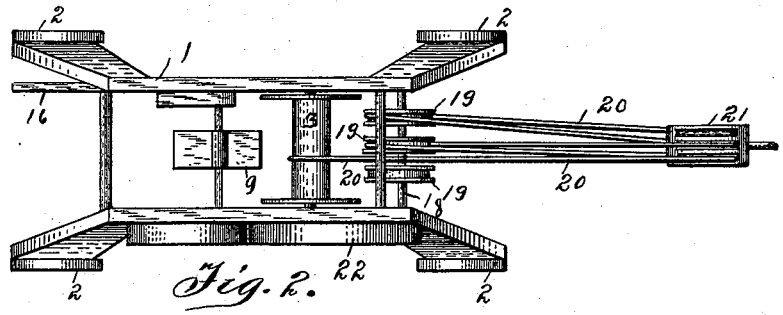
Figure 3:
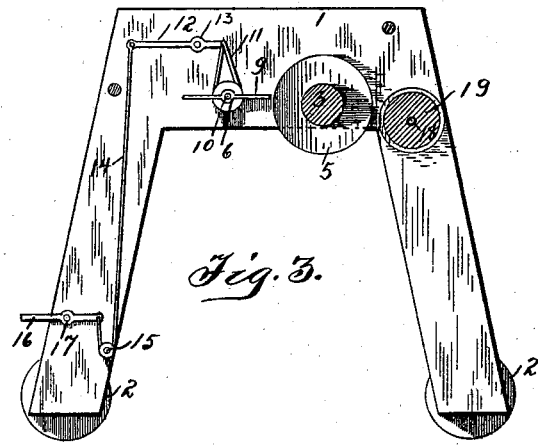

Figure 1 is a side elevation. Fig. 2 is a top plan view. Fig. 3 is a sectional view.

Referring to the drawings, 1 designates a frame provided with rollers 2. Journaled in the frame is a shaft 3, carrying on one end a gear-wheel 4, and mounted on said shaft is a drum 5, on which the rope is wound. Also journaled in the frame is a shaft 6, carrying on one end a gear-wheel 7, meshing with gear-wheel 4. Secured to said shaft is an operating-handle 8. Secured to the shaft between the frames is a fan 9, serving as a speed-regulator, and a brake-wheel 10, acting as a brake to stop the wheel. Pivoted at 13 is a lever 12, one end of which is secured to the brake-band 11, the opposite end engaging a strap or chain 14, operating around an idler 15. The opposite end of the strap engages a foot-lever 16, fulcrumed at 17.

Secured in the frame 1 is a shaft 18, carrying loose pulleys 19. Secured to the drum 5 is a rope 20, passing through the pulley 21 and around the loose pulleys 19 on the shaft 18. The gear-wheels 4 and 7 are protected by a shield 22, secured to the frame 1.

The operation is as follows: The pulley 21 is secured to the load (not shown) and the crank-handle 8 is operated, turning the gear-wheel 7, which transmits power to the gear-wheel 4, which operates the drum 5, winding the rope on the drum. When the load is to be lowered, the pawl is released, permitting a free movement of the gear-wheels, which are governed by the fan 9, secured to the shaft 6, and when it is desired to stop the machine the brake is applied.

It will be noted that various changes may be made in the details of construction without departing from the general spirit of my invention.

Having fully described my invention, what I claim as new, and desire to secure by Letters Patent, is—

A hoisting-machine comprising frames, two shafts journaled in the frames, a crank-handle and a power-wheel on one end of the one shaft, a governor and a friction-wheel secured to said last-named shaft between the frames, a drum mounted on the other of said shafts, a drive-wheel secured to the shaft carrying the drum and meshing with the said power-wheel, a lever fulcrumed in the frame, a brake-band engaging the said friction-wheel and secured to one end of the said lever, a pulley and a foot-lever secured to the lower portion of the frame, and a strap or chain attached to the opposite end of the first lever, and thence passing around the said pulley and attached to the said foot-lever, substantially as shown and described.

In testimony whereof I affix my signature in presence of two witnesses.

JOHN HENRY HAMMER.

Witnesses:
 W. H. TIMMERMANN,
 THOS. M. BOYD, Jr.